United States Patent
Singh et al.

(10) Patent No.: US 10,756,390 B2
(45) Date of Patent: Aug. 25, 2020

(54) CONCENTRATED ELECTROLYTE SOLUTION

(71) Applicant: SES Holdings Pte. Ltd., Singapore (SG)

(72) Inventors: Rajendra P. Singh, Broomfield, CO (US); Jerry Lynn Martin, Superior, CO (US)

(73) Assignee: SES Holdings Pte. Ltd., Singapore (SG)

( * ) Notice: Subject to any disclaimer, the term of this patent is extended or adjusted under 35 U.S.C. 154(b) by 604 days.

(21) Appl. No.: 14/944,183

(22) Filed: Nov. 17, 2015

(65) Prior Publication Data
US 2016/0149262 A1    May 26, 2016

Related U.S. Application Data

(60) Provisional application No. 62/082,607, filed on Nov. 20, 2014.

(51) Int. Cl.
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0025* (2013.01); *H01M 2300/0028* (2013.01)

(58) Field of Classification Search
CPC ......... H01M 10/0568; H01M 10/0569; H01M 2300/0028
See application file for complete search history.

(56) References Cited

U.S. PATENT DOCUMENTS

| | | |
|---|---|---|
| 4,505,997 A | 3/1985 | Armand et al. |
| 6,365,301 B1 | 4/2002 | Michot et al. |
| 2004/0106047 A1* | 6/2004 | Mie ........................ H01M 6/166 429/324 |
| 2014/0255796 A1* | 9/2014 | Matsuoka ........... H01M 4/0445 429/339 |
| 2015/0364794 A1* | 12/2015 | Nakazawa ............ H01M 4/587 429/200 |

OTHER PUBLICATIONS

A. Hammami. A cloned horse born to its dam twin, book, Aug. 2003, pp. 635-636, vol. 424 No. 6949.
Christopher L. Campion; Wentao Li; and Brett L. Lucht. Thermal Decompositions of LiPF6-Based Electrolytes for Lithium-Ion Batteries, Journal of the Electrochemical Society, 2005, pp. A2327-A2334.
J. S. Gnanaraj et al. A Detailed Investigation of the Thermal Reactions of LiPF6 Solution in Organic Carbonates Using ARC and DSC, Journal of the Electrochemical Society, 2003, pp. A1533-A1537.
U. Heider; R. Oesten; and M. Jungnitz. Challenge in manufacturing electrolyte solutions for lithium and lithium ion batteries quality control and minimizing contamination level, Journal of Power Sources, 1999, pp. 119-122. No. 81-82.
Larry J. Krause et al. Corrosion of aluminum at high voltages in non-aqueous electrolytes containing perfluoroalkylsulfonyl imides; new lithium salts, 1997, pp. 320-325, No. 68.
Ken Tasaki; Katsuya Kanda; Shinichiro Nakamura; and Makoto UE. Decomposition of LiPF6 and Stability of PF5 in Li-Ion Battery Electrolytes, 2003, pp. A1628-A1636.
Ella Zinigrad et al. On the thermal stability of LiPF6, Thermochimica Acta, 2005, pp. 184-191.
Kang Xu. Nonaqueous Liquid Electrolytes for Lithium-Based Rechargeable Batteries, Chem. Rev., 2004, pp. 4303-4417.
Hui Yang; Guorong V. Zhuang; and Philip N. Ross Jr.. Thermal stability of LiPF6 salt and Li-ion battery electrolytes containing LiPF6, Journal of Power Sources, 2006, pp. 573-579.

\* cited by examiner

*Primary Examiner* — Osei K Amponsah

(74) *Attorney, Agent, or Firm* — Downs Rachlin Martin PLLC

(57) ABSTRACT

The present invention provides a single-phase or homogeneous solution comprising a high concentration of a salt, in particular a lithium salt, in an organic solvent. Such a high salt content in organic solvent is useful in a variety of applications including, but not limited to, in electrical energy storage devices as well as other devices that can benefit from a low-volatility liquid electrolyte.

7 Claims, No Drawings

CONCENTRATED ELECTROLYTE SOLUTION

CROSS-REFERENCE TO RELATED APPLICATIONS

This application claims the priority benefit of U.S. Provisional Application No. 62/082,607, filed Nov. 20, 2014, which is incorporated herein by reference in its entirety.

FIELD OF THE INVENTION

The present invention relates to a single-phase or homogeneous solution comprising a high concentration of a salt, in particular a lithium salt, in an organic solvent. Such a high salt content in organic solvent is useful in a variety of applications including, but not limited to, in transportation and long-term storage as well as electrical energy storage devices and other devices that can benefit from a low-volatility liquid electrolyte.

BACKGROUND OF THE INVENTION

Most batteries currently utilize liquid electrolytes to carry ions between the anode and cathode. In lithium-ion batteries, these electrolytes most commonly comprise organic solvents, lithium salts, and performance-enhancing additives. Typical electrolytes in common use comprise carbonate solvents such as ethylene carbonate (EC), diethylcarbonate (DEC), dimethylcarbonate (DMC), and propylene carbonate (PC). Among the conducting salts lithium hexafluorophosphate ($LiPF_6$) is used almost exclusively as conducting salt for state-of-art high energy lithium-ion batteries[1]. Nevertheless, its limited thermal and chemical stability restricts its use at low and high temperatures. In the carbonate-based solvents, the poorly solvated $PF_6^-$ anion is highly reactive towards even weak nucleophiles and the presence of even a trace amount of water (or alcohols) produces hydrofluoric acid [2]-[5]. Also at high temperature, $LiPF_6$ decomposes to produce phosphorous pentafluoride [$LiPF_6$=$LiF$+$PF_5$][6], [7] $PF_5$ which in turn reacts with solvent to generate highly toxic substances[8] or initiate polymerization of solvents[3], [7]. This raises the safety issues particular of the use in lithium ion batteries for passenger cars. Therefore, new lithium salts with improved properties are highly desired to improve the safety and performance of lithium-ion batteries.

Over past two decades, great efforts have been made to develop new lithium salts with improved chemical and/or electrochemical properties. Thus, various weakly coordinated anions have been proposed as possible counter parts of lithium salts for Li-ion batteries. Among those, lithium bis(trifluoromethylsulfonyl)imide (LiTFSI) and lithium bis(fluorosulfonyl)imide (LiFSI) salts have shown no spontaneous decomposition and hydrolytically are more stable than $LiPF_6$. LiTFSI was initially suggested by Armand and Kadiri [9] then commercialized by 3M. However, LiTFSI has the disadvantage of being corrosive to aluminum current collectors[10] which is not the case with LiFSI. Therefore, LiFSI is a promising alternative salt for lithium ion batteries and ultra-capacitors.

Very recently, there has been growing interest in LiFSI as a conducting salt. LiFSI was first claimed as conducting salts with good anti-corrosive properties in Li-ion batteries in 1995[11] however, a little attention was paid to it until recently[12] presumably due to the fact that it is difficult to prepare with high purity in an unspecialized laboratory.

To prepare an electrolyte, solvents, salts and additives are mixed together. Since the water content of the final electrolyte must be very low (typically 500 ppm or less) either this mixing must be conducted under anhydrous conditions, or water must be removed from the electrolyte after one or more of the components are mixed together. The requirement for conducting these operations without introducing water into the electrolyte increases the cost and complexity of preparing electrolytes. Water may be removed from the complete electrolyte by various methods. The use of molecular sieves or zeolites to remove water from organic solvents is well-known. However, the zeolites used typically contain other metals that are not lithium, and may exchange with lithium-ions in solution, both reducing the lithium content of the electrolyte and increasing the metal impurities in the electrolyte. Lithium-exchanged zeolites such as lithium beta zeolite sold by Tosoh may be used, but these zeolites are substantially more expensive than sodium zeolites and are not easily regenerated.

The preparation of electrolytes is further complicated by the need to handle dry powders of the lithium salts. Many lithium salts, including $LiPF_6$ and LiFSI, are highly hygroscopic. LiFSI is deliquescent; it will absorb sufficient moisture from the air to form a liquid solution. For these reasons, lithium salts are supplied as a powder in sealed containers with complex airlocks to connect with mixing equipment without introducing moisture. As the material must be handled as a powder, the salt must be prepared in a form that is free-flowing. Many disclosed techniques for preparing lithium salts produce a fine powder that is not free-flowing. To convert the crude lithium salts to a free-flowing powder requires additional manufacturing steps such as agglomeration or slow crystallization. Each of these steps requires additional time, capital costs and operating costs and reduces the yield of the salt.

In some cases, it may be possible to avoid the recrystallization and isolation steps by preparing the lithium salt directly in the final electrolyte solvent. For example U.S. Pat. No. 5,496,661, issued to Mao, discloses the preparation of a 1 molar solution of $LiPF_6$ in a mixture of EC and DEC by the reaction of $NH_4PF_6$ and LiH in the solvents, followed by removal of the product gases and filtration of solid impurities. While these methods avoid the crystallization and handling of solid lithium salts, the resulting electrolyte is generally of lower purity than that produced by mixing recrystallized $LiPF_6$ salts and highly pure solvents. Thus the use of these electrolytes is generally restricted to primary cells and lower-performance batteries.

In addition, $LiPF_6$ has limited solubility in carbonate solvents and electrolytes with concentrations above 1 molar crystallize or form glasses upon cooling below room temperature, which presents problems in shipping and handling. Due to the limited solubility, it is not practical to prepare a master solution of concentrated lithium salt and solvent which could be diluted to provide a variety of electrolyte formulations.

Thus, state-of-the-art methods for preparing lithium salts for use in electrolytes generally involve crystallization and drying steps to produce free-flowing powders. Electrolyte preparation requires handling these powders without introducing water, which increases the cost and complexity of electrolytes. Therefore, there is a clear unmet need for simplified methods of delivering lithium salts for electrolytes that avoids the need to handle solids and provides an electrolyte of high purity.

SUMMARY OF THE INVENTION

Some aspects of the invention provide a highly concentrated organic solution that dramatically simplifies the preparation of electrolyte solutions. One particular aspect of the invention provides an organic solution having an electrolyte salt in an amount of at least 30% by weight. The organic solution of the invention comprising a high salt content is a single-phase liquid or homogeneous solution. Unless the context requires otherwise, the terms "single-phase" and "homogeneous" are used interchangeably herein and refer to a solution having no observable or measurable differences in different portions of the solution or having the same proportions (e.g., of the dissolved salt) throughout a given sample or multiple samples of different proportion of the solution resulting in a consistent mixture.

In some embodiments, the organic solution of the invention remains single-phase even at temperature of about −20° C., typically even at about −10° C., often even at about 0° C., and most often even at room temperature (e.g., about 20° C.).

Yet in other embodiments, the amount of water present in the organic solution of the invention is about 5,000 ppm or less, typically about 1,000 ppm or less, often about 500 ppm or less, more often 250 ppm or less and most often 100 ppm or less. Throughout the present disclosure, the term "about" refers to ±20%, typically ±10%, often ±5% and most often ±2% of the numeric value.

One particular aspect of the invention provides a homogeneous organic solution comprising at least 30% by weight of a lithium salt and less than 500 ppm of water.

In one particular embodiment, the homogeneous solution is substantially anhydrous. The term "anhydrous" refers to having about 1% by weight of water or less, typically about 0.5% by weight of water or less, often about 0.1% by weight of water or less, more often about 0.01% by weight of water or less, and most often about 0.001% by weight of water or less. Within this definition, the term "substantially anhydrous" refers to having about 0.1% by weight of water or less, typically about 0.01% by weight of water or less, and often about 0.001% by weight of water or less.

Still in another embodiment, the lithium salt comprises a moiety of the formula: —S(O)$_2$—N—S(O)$_2$—. In some embodiments, the lithium salt in organic solutions of the invention is of the formula X$^+$Y$^-$, where X$^+$ is a cationic portion and Y$^-$ is an anionic portion of the molecule. In one specific embodiment, Y$^-$ is a bis(fluorosulfonyl) moiety of the formula: F—S(O)$_2$—Z—S(O)$_2$—F, where Z is N$^-$ or (C$^-$)R$^1$; and R$^1$ is H, halide, optionally substituted alkyl, optionally substituted alkenyl, optionally substituted alkynyl, haloalkyl, haloalkenyl, or haloalkynyl.

In one particular embodiment, Y$^-$ is bis(fluorosulfonyl) imide ("FSI").

Surprisingly and unexpectedly, it has been found by the present inventors that even at such a high concentration of lithium salt, all of the salt in the organic solution of the invention is completely dissolved, i.e., there is no visually observable solid lithium salt in the organic solution. Moreover, no settling or precipitation of salt is observed at room temperature, even at 0° C., typically even at −10° C., and often even after 24 hours, 48 hours, 72 hours, or even after one week of storage.

The amount of lithium salt present in the organic solution of the invention is about 30% by weight or more, typically about 35% by weight or more, often 40% by weight or more, more often about 45% by weight or more, and most often about 50% by weight or more.

The solution of the invention also includes organic solvent, typically an aprotic organic solvent. The solution can include a mixture of two or more such organic solvents and may also include ionic liquids. It should be appreciated that when a mixture of two or more of organic solvents or ionic liquids is used, such a mixture of solvents is miscible and form a homogenous/single-phase solution. In some embodiments, the solution of the invention comprises a single (i.e., one) organic solvent, i.e., the solvent is at least about 95%, typically at least about 98%, often at least about 99% and more often at least about 99.99% pure solvent, i.e., excluding lithium salt that is present in the solution.

Organic solvents that can be used in the invention include any aprotic organic solvents known to one skilled in the art. Exemplary aprotic organic solvents that can be used in the invention include, but are not limited to, acetonitrile, γ-butyrolactone, diethyl carbonate, 1,2-dimethoxyethane, dimethyl carbonate, 1,3-dioxolane, ethyl acetate, ethylene carbonate, ethyl methyl carbonate, propylene carbonate, tetrahydrofuran, fluorinated carbonates, and the like. In some embodiments, the solvent that is used in the electrolyte solution of the invention comprises a mixture of two or more of organic solvents and may also include ionic liquids.

DETAILED DESCRIPTION OF THE INVENTION

Some aspects of the invention provide a concentrated single-phase liquid solution comprising a high concentration of lithium salt in an organic solvent. In one particular embodiment, the lithium salt is lithium bis(fluorosulfonyl) imide (LiFSI). The amount of lithium salt present in the solution of the invention is at least about 30% by weight. In other embodiments, the amount of lithium salt present in the solution of the invention is at least about 40% by weight. Still in other embodiments, the organic solvent comprises acetonitrile, γ-butyrolactone, diethyl carbonate, 1,2-dimethoxyethane, dimethyl carbonate, 1,3-dioxolane, ethyl acetate, ethylene carbonate, ethyl methyl carbonate, propylene carbonate, tetrahydrofuran, fluorinated carbonates or mixtures thereof. Yet in other embodiments, the organic solvent comprises ethylene carbonate. In one particular embodiment, the organic solvent comprises at least about 70% by weight of ethylene carbonate.

Another aspect of the invention provides a homogeneous organic solution comprising a mixture of a high concentration of lithium salt and an organic solvent, wherein the amount of lithium salt in said solution is at least about 30% by weight, typically at least about 40% weight, and often at least about 50% by weight. Generally, the organic solvent comprises about 0.1% by weight or less of a protic solvent.

In one particular embodiment, the high salt concentration organic solution of the invention comprises lithium bis(fluorosulfonyl)imide. The highly concentrated lithium salt solutions of the invention simplify the preparation of other concentrations of electrolyte solutions.

Preparation of homogeneous concentrated electrolyte solutions using other well-known lithium salts such as LiPF$_6$, LiBOB, LiAsF$_6$, and LiClO$_4$ is not possible. As shown in comparative example 1 and 2 in the Examples section below, all attempts to prepare concentrated solutions of these salts failed as the solutions crystallized or formed glasses near room temperature.

Surprisingly and unexpectedly, and in stark contrast to prior-art lithium salts, the present inventors have discovered that it is possible to prepare concentrated solutions of LiFSI and organic solvents at very high concentrations without crystallization at room temperature, e.g., about 20° C. at 1 atmosphere of pressure. For example, LiFSI/EC solutions can be prepared with a concentration of 50 wt % LiFSI, and that such mixtures remain liquid well below room temperature. The melting point of LiFSI is 130° C., and the melting point of EC is 37° C., i.e., individually both are solids at room temperature. In an unexpected result, a LiFSI/EC solution containing approximately 50 wt % LiFSI is a homogenous liquid solution at room temperature, and remains a liquid even at below 0° C. This melting point depression of >40° C. is surprising, and not found in other lithium salt/solvent mixtures commonly used in lithium ion battery electrolytes.

In one particular embodiment, the solution of the invention typically contains at least about 33 wt %, often at least about 40 wt %, and most often at least about 50 wt % of LiFSI in EC. This solution can be used to prepare electrolyte solution formulations by diluting with other solvents. Table 1 shows several different electrolyte formulations currently used in lithium-ion batteries. For each of these electrolytes, the ratio of lithium salt to EC does not exceed 0.6 by mass, or equivalently 33 wt % lithium salt in EC. This means that each of these electrolytes can be prepared by diluting a 33 wt % LiFSI concentrated electrolyte solution of the invention with the other solvents in the electrolyte.

TABLE 1

Example electrolyte formulations used in lithium-ion batteries.

| electrolyte number | composition (wt %) | | | | | Li salt/EC ratio by mass |
|---|---|---|---|---|---|---|
| | LiPF$_6$ | EC | DMC | DEC | EMC | |
| LP30 | 11.8 | 44.1 | 44.1 | | | 0.268 |
| LP40 | 12.4 | 43.8 | | 43.8 | | 0.283 |
| LP47 | 13.1 | 26.1 | | 60.8 | | 0.502 |
| LP50 | 12.2 | 43.9 | | | 43.9 | 0.277 |
| LP57 | 12.7 | 26.2 | | | 61.1 | 0.485 |
| LP71 | 12.4 | 29.2 | 29.2 | 29.2 | | 0.424 |

The solvent used in the invention is not particularly limited. Any solvent that can form a homogenous mixture with LiFSI at 30 wt % or greater can be used including, but not limited to, solvents that are suitable for use as a battery electrolyte solution. The solvents used can be either organic solvents or molten salts or ionic liquids. Examples of organic solvents include, but are not limited to, acetonitrile, γ-butyrolactone, diethyl carbonate, 1,2-dimethoxyethane, dimethyl carbonate, 1,3-dioxolane, ethyl acetate, ethylene carbonate, ethyl methyl carbonate, propylene carbonate, and tetrahydrofuran. Examples of molten salts or ionic liquids include 1-ethyl-3-methylimidazolium bis(trifluoromethylsulfonyl)imide, 1-ethyl-3-methylimidazolium bis(fluorosulfonyl)imide, 1-methyl-1-propylpyrrolidinium bis(fluorosulfonyl)imide, and 1-methyl-1-propylpyrrolidinium bis(trifluoromethylsulfonyl)imide. In addition fluorinated solvents can be used, including fluorinated carbonates, ethers, esters, organosilanes, sulfones, sulfoxides, phosphonates, phosphazenes, phosphates and dinitriles. Of these ethylene carbonate (EC) is typically used as a solvent, as the majority of lithium-ion battery electrolytes include EC in their solvent mixtures.

A particular advantage of using EC as the solvent is the high boiling point of EC (261° C.). Due to its high boiling point, water can be relatively easily removed from the solution, for example, by either vacuum or sparging with a gas of low solubility such as nitrogen, argon, hydrogen or helium without removing a significant quantity of the solvent. This approach is not cost-effective with lower boiling point solvents such as DMC or DEC.

Another aspect of the invention provides a homogeneous liquid solution composition. In this aspect of the invention, the composition comprises a lithium salt and a carbonate. It should be noted that in some embodiments both the lithium salt and the carbonate are individually a solid at standard conditions. The term "standard conditions" is well known to those skilled in the art of chemistry and refers to temperature of 20° C. at 1 atmosphere of pressure. While both lithium salt and the carbonates are individually (i.e., in its "pure form") solids, when combined as disclosed herein form a liquid solution. As used herein, the term "pure form" refers to a compound (e.g., lithium salt or carbonate) that is at least about 90%, typically at least about 95%, often at least 98%, and most often at least 99% pure. Surprisingly and unexpectedly, the present inventors have discovered that when admixed together, some lithium salts and carbonate combinations for a homogeneous liquid solution such that the melting point (i.e., the freezing point) of the composition is about 0° C. or lower and typically about −10° C. or lower at standard conditions. The homogeneous liquid solution or any other liquid composition of the invention can also include other lithium salts besides LiFSI. Exemplary lithium salts that can be present besides LiFSI include, but are not limited to, those lithium salts that are known to one skilled in the art as being useful in lithium batteries, such as LiPF$_6$, LiBOB, LiAsF$_6$, LiClO$_4$ and a combination thereof.

Concentrated electrolyte solutions of the invention can be prepared by conventional means. In one particular illustrative method of preparing a concentrated electrolyte solution of the invention, a dry LiFSI salt is added to ethylene carbonate to form the concentrated salt solution. The temperature of this addition is not particularly limited, but the mixing is typically performed while maintaining the mixture at a temperature in the range of 35° C. to 120° C. At temperatures below 35° C., the EC is solid, and at temperatures above 120° C., the LiFSI salt may degrade. Generally, a temperature range of 38° C. to 60° C. is used for preparation of the electrolyte solution of the invention.

In another illustrative method of preparing a concentrated electrolyte solution of the invention, the LiFSI is formed directly in the organic solvent, for example, through the neutralization of bis(fluorosulfonyl)imide (HFSI) with a lithium base. Thus, LiFSI can be produced by the neutralization of HFSI with lithium carbonate, lithium hydroxide or a mixture of these two bases in the presence of a carbonate solvent. This process is easily scalable and economical, with a yield of at least 90%, typically at least 95%, and often at least near quantitative (i.e., >99%) of LiFSI. Water produced in the neutralization can be removed by any conventional methods known to one skilled in the art, e.g., heating the solution under vacuum or in the absence of vacuum, subjecting the solution to a stream of dry gas, or a combination of both. In one particular embodiment, water is removed by heating the solution to 45° C. under a mild vacuum. The term "under a mild vacuum" refers to a condition in which the reaction mixture is subject to at least about 100 mm of Hg, typically at least about 200 mm of Hg, often at least about 300 mm of Hg, more often at least 400 mm of Hg, and most often at least 500 mm of Hg pressure less than the ambient pressure, e.g., which is 760 mm of Hg at sea level at 20° C.

Another aspect of the invention provides a method for producing a carbonate solution of LiFSI. The method generally comprises admixing bis(fluorosulfonyl)imide (HFSI) with a lithium base in the presence of a carbonate under conditions sufficient to produce LiFSI solution. It should be appreciated that in some embodiments, all of the starting reagents are solids at standard conditions. As the reaction progresses, the reaction mixture becomes liquid until a homogeneous liquid solution is obtained. In another embodiment the lithium base comprises lithium carbonate, lithium hydroxide or a mixture thereof. Typically, methods of the invention produce LiFSI in a yield of at least about 90%, typically at least about 95%, often at least about 98% and most often substantially quantitatively (e.g., >99%). When lithium hydroxide is used as a base, one of the byproducts formed is water. This water byproduct can be readily removed from the reaction mixture by any of the methods known to one skilled in the art including drying (e.g., using an anhydrous drying agent or a molecular sieves), distillation (at ambient pressure or under vacuum), sparging with an inert gas (e.g., nitrogen, helium, etc.), or any combination thereof. In one particular embodiment, water is removed by heating the admixture to 45° C. under vacuum.

The homogeneous liquid solution can be further diluted with an organic solvent, ionic liquid or a combination thereof. In this manner, one can readily produce an electrolyte solution for use in a lithium battery. Thus in this manner, the homogeneous liquid solution of the invention can include two or more different organic solvents. In some embodiment, the homogeneous liquid solution of the invention includes one or more ionic liquids.

Typically, LiFSI used in preparation of the concentrated electrolyte solution of the invention is substantially halide free. As used herein, the term "substantially halide free" means the purity of the metal salt is such that the amount of non-fluorine halide present is about 10 ppm or less, typically about 5 ppm or less, and often 2 ppm or less. Low halide content is desirable for use in many electrochemical applications. It has been shown that chloride contents of more than 50 ppm make LiFSI unsuitable for use in lithium ion batteries. See, for example, H.-B. Han et al. in "Lithium bis(fluorosulfonyl)imide (LiFSI) as conducting salt for non-aqueous liquid electrolytes for lithium ion batteries: Physicochemical and electrochemical properties," *Journal of Power Sources*, 2011, vol. 196, no. 7, pp. 3623-3632.

Additional objects, advantages, and novel features of this invention will become apparent to those skilled in the art upon examination of the following examples thereof, which are not intended to be limiting. In the Examples, procedures that are constructively reduced to practice are described in the present tense, and procedures that have been carried out in the laboratory are set forth in the past tense.

EXAMPLES

Unless otherwise stated, all the chemicals used were of reagent grades. Bis(fluorosulfonyl)imide used was prepared according to the methods of U.S. Pat. No. 8,722,005.

Comparative Example 1: LiPF$_6$ 50 wt % Mixture with EC 0.1175 moles (10.35 grams) of ethylene carbonate (EC) was mixed with 0.0681 moles (10.35 grams) of lithium hexafluorophosphate (LiPF$_6$), making a 50 wt % LiPF$_6$ mixture. The LiPF$_6$ mixture immediately turned to a solid, crystal-like substance which did not flow at room temperature.

Comparative Example 2: LiPF$_6$ 30 wt % Mixture with EC

The procedure of Comparative Example 1 was repeated with a lower concentration of LiPF$_6$. Briefly, 0.2742 moles (24.15 grams) of EC was mixed with 0.0681 moles (10.35 grams) of lithium hexafluorophosphate (LiPF$_6$), making a 30 wt % LiPF$_6$ mixture. The LiPF$_6$ and EC formed a 2-phase mixture of liquid solution and insoluble solid LiPF$_6$.

Example 1: Preparation of a >50 wt % Mixture of LiFSI in EC 0.1652 moles (14.55 grams) of ethylene carbonate (EC) was mixed with 0.0826 moles (15.45 grams) of lithium bis(fluorosulfonyl)amide (LiFSI), making a 51.5 wt % LiFSI mixture. The resulting concentrated electrolyte was a homogenous liquid solution that did not solidify upon overnight storage at −10° C.

Example 2: Neutralization Reaction of HFSI with Li$_2$CO$_3$ in Anhydrous Ethylene Carbonate In a dry flask equipped with stirring device, Li$_2$CO$_3$ (13.1 g, 0.177 mole) was mixed with anhydrous ethylene carbonate (67.1 g, 0.761 mole). The mixture was maintained in a thermostatic bath at 38° C.±5° C. Neat HFSI (65 g, 0.359 mole) was added slowly in such a way that the solution temperature did not increase >42° C. After complete addition of HFSI, it was cooled to room temperature and completely neutralized by adding saturated aqueous lithium hydroxide solution (few drops). It was filtered to remove insoluble impurities. The filtrate was concentrated at <100 mtorr at 45-50° C. to achieve a dry electrolyte solution. Yield: 127.5 g, 95% (~50% solution of LiFSI in EC). IC data: F$^-$<1 ppm, Cl$^-$<9 ppm, Sulfate<17 ppm, H$_2$O by KF: <40 ppm.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. All references cited herein are incorporated by reference in their entirety.

CITED REFERENCES

[1] K. Xu, "Nonaqueous liquid electrolytes for lithium-based rechargeable batteries," *Chemical Reviews*, vol. 104, no. 10, pp. 4303-4417, 2004.

[2] J. S. Gnanaraj, E. Zinigrad, L. Asraf, H. E. Gottlieb, M. Sprecher, M. Schmidt, W. Geissler, and D. Aurbach, "A Detailed Investigation of the Thermal Reactions of LiPF [sub 6] Solution in Organic Carbonates Using ARC and DSC," *Journal of The Electrochemical Society*, vol. 150, no. 11, p. A1533, 2003.

[3] C. L. Campion, W. Li, and B. L. Lucht, "Thermal Decomposition of LiPF$_6$-Based Electrolytes for Lithium-Ion Batteries," *J. Electrochem. Soc.*, vol. 152, no. 12, pp. A2327-A2334, December 2005.

[4] U. Heider, R. Oesten, and M. Jungnitz, "Challenge in manufacturing electrolyte solutions for lithium and lithium ion batteries quality control and minimizing contamination level," *Journal of power sources*, vol. 81, pp. 119-122, 1999.

[5] K. Tasaki, K. Kanda, S. Nakamura, and M. Ue, "Decomposition of LiPF$_6$ and Stability of PF 5 in Li-Ion Battery Electrolytes Density Functional Theory and Molecular Dynamics Studies," *Journal of The Electrochemical Society*, vol. 150, no. 12, pp. A1628-A1636, 2003.

[6] H. Yang, G. V. Zhuang, and P. N. Ross, "Thermal stability of LiPF$_6$ salt and Li-ion battery electrolytes containing LiPF$_6$," *Journal of power sources*, vol. 161, no. 1, pp. 573-579, 2006.

[7] E. Zinigrad, L. Larush-Asraf, J. S. Gnanaraj, M. Sprecher, and D. Aurbach, "On the thermal stability of LiPF$_6$," *Thermochimica Acta*, vol. 438, no. 1-2, pp. 184-191, November 2005.

[8] A. Hammami, N. Raymond, and M. Armand, "Lithium-ion batteries: Runaway risk of forming toxic compounds," *Nature*, vol. 424, no. 6949, pp. 635-636, August 2003.

[9] M. B. Armand and C. E. M. F. El Kadiri, "Bis perhalogenoacyl- or sulfonyl-imides of alkali metals, their solid solutions with plastic materials and their use to the constitution of conductor elements for electrochemical generators," 4505997, 19 Mar. 1985.

[10] L. J. Krause, W. Lamanna, J. Summerfield, M. Engle, G. Korba, R. Loch, and R. Atanasoski, "Corrosion of aluminum at high voltages in non-aqueous electrolytes containing perfluoroalkylsulfonyl imides; new lithium salts for lithium-ion cells," *Journal of power sources*, vol. 68, no. 2, pp. 320-325, 1997.

[11] C. Michot, M. Armand, M. Gauthier, and N. Ravet, "Materials useful as electrolytic solutes," 6365301, 2 Apr. 2002.

[12] K. Zaghib, P. Charest, A. Guerfi, J. Shim, M. Perrier, and K. Striebel, "Safe Li-ion polymer batteries for HEV applications," *Journal of Power Sources*, vol. 134, no. 1, pp. 124-129, July 2004.

What is claimed is:

1. A concentrated single-phase organic electrolyte solution consisting essentially of lithium bis(fluorosulfonyl) imide (LiFSI) in one or more organic solvents, wherein the LiFSI has a concentration in said concentrated single-phase organic electrolyte solution of more than 40% by weight.

2. The concentrated single-phase organic electrolyte solution of claim 1, wherein the LiFSI concentration in said concentrated single-phase organic electrolyte solution is at least 50% by weight.

3. The concentrated single-phase organic electrolyte solution of claim 1, wherein said concentrated single-phase organic electrolyte solution further comprises an ionic liquid.

4. The concentrated single-phase organic electrolyte solution of claim 1, wherein said one or more organic solvents is selected from the group consisting of: acetonitrile, y-butyrolactone, diethyl carbonate, 1,2-dimethoxyethane, dimethyl carbonate, 1,3-dioxolane, ethyl acetate, ethylene carbonate, ethyl methyl carbonate, propylene carbonate, tetrahydrofuran, fluorinated carbonates, and a mixture thereof.

5. The concentrated single-phase organic electrolyte solution of claim 1, wherein said one or more organic solvents comprises ethylene carbonate.

6. The concentrated single-phase organic electrolyte solution of claim 1, wherein said concentrated single-phase organic electrolyte solution is in the liquid state at 10° C.

7. The concentrated single-phase organic electrolyte solution of claim 1, wherein said concentrated single-phase organic electrolyte solution is in the liquid state at 0° C.

* * * * *